(12) United States Patent
Howley et al.

(10) Patent No.: US 11,652,702 B2
(45) Date of Patent: May 16, 2023

(54) CONFIGURING A SOFTWARE AS-A-SERVICE PLATFORM FOR REMOTELY MANAGING A CLOUD APPLICATION

(71) Applicant: Hewlett Packard Enterprise Development LP, Houston, TX (US)

(72) Inventors: Tom Howley, Galway (IE); Mark Rawlings, Galway (IE); Tom Hancock, Galway (IE); Eamonn O'Toole, Galway (IE)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/305,340

(22) Filed: Jul. 6, 2021

(65) Prior Publication Data
US 2023/0010219 A1  Jan. 12, 2023

(51) Int. Cl.
*H04L 41/00* (2022.01)
*G06F 9/54* (2006.01)
*H04L 41/0806* (2022.01)
*H04L 12/66* (2006.01)
*H04L 41/0813* (2022.01)
*H04L 67/10* (2022.01)
*H04L 67/54* (2022.01)

(52) U.S. Cl.
CPC ............. *H04L 41/20* (2013.01); *G06F 9/541* (2013.01); *H04L 12/66* (2013.01); *H04L 41/0806* (2013.01); *H04L 41/0813* (2013.01); *H04L 67/10* (2013.01); *H04L 67/54* (2022.05)

(58) Field of Classification Search
None
See application file for complete search history.

(56) References Cited

U.S. PATENT DOCUMENTS 9,354,983 B1 * 5/2016 Yenamandra ......... G06F 16/178
9,426,030 B1 * 8/2016 Anerousis ............... H04L 41/08
(Continued)

OTHER PUBLICATIONS

"IBM Cloud Management Console—Overview" posted at <https://www.ibm.com/products/cloud-management-console> on May 11, 2021 (Year: 2021).*
(Continued)

*Primary Examiner* — Scott B Christensen
(74) *Attorney, Agent, or Firm* — Mauriel Kapouytian Woods LLP

(57) ABSTRACT

Examples described herein relate to a configuration manager for configuring a cloud application at a SaaS platform. The configuration manager is hosted on a cloud platform separate from a tenant site. The configuration manager receives a request for enabling remote management of the cloud application hosted on the tenant site. The configuration manager determines configuration content applicable for the cloud application from a configuration repository and configures the SaaS platform for remotely managing the cloud application based on the configuration content. The SaaS platform is a service associated with a management tooling used at the tenant site. The management tooling may be a monitoring tooling or a logging tooling. Once configured, the SaaS platform receives monitoring data or logging data from the infrastructure at the tenant site.

22 Claims, 7 Drawing Sheets

(56) References Cited

U.S. PATENT DOCUMENTS

| | | |
|---|---|---|
| 9,882,829 B2 | 1/2018 | Maes et al. |
| 10,171,560 B2 | 1/2019 | Durairajan et al. |
| 2016/0197980 A1* | 7/2016 | Durairajan .......... H04L 41/0895 709/223 |
| 2017/0097818 A1* | 4/2017 | Heine ..................... H04L 67/34 |
| 2020/0287868 A1* | 9/2020 | Andersen ............ H04L 63/0281 |

OTHER PUBLICATIONS

Oracle; "Cloud Control Administrator's Guide"; Dec. 2020; 19 pages.

* cited by examiner

CONFIGURING A SOFTWARE AS-A-SERVICE PLATFORM FOR REMOTELY MANAGING A CLOUD APPLICATION

BACKGROUND

Software as a service (SaaS) platform is used by enterprises for remote monitoring and management of their cloud and on-premise infrastructure. The use of the SaaS platform allows a customer to remotely manage applications present in multiple geographically distributed on-premise infrastructures.

BRIEF DESCRIPTION OF DRAWINGS

These and other features, aspects, and advantages of the present specification will become better understood when the following detailed description is read with reference to the accompanying drawings in which like characters represent like parts throughout the drawings, wherein.

Figure 1:
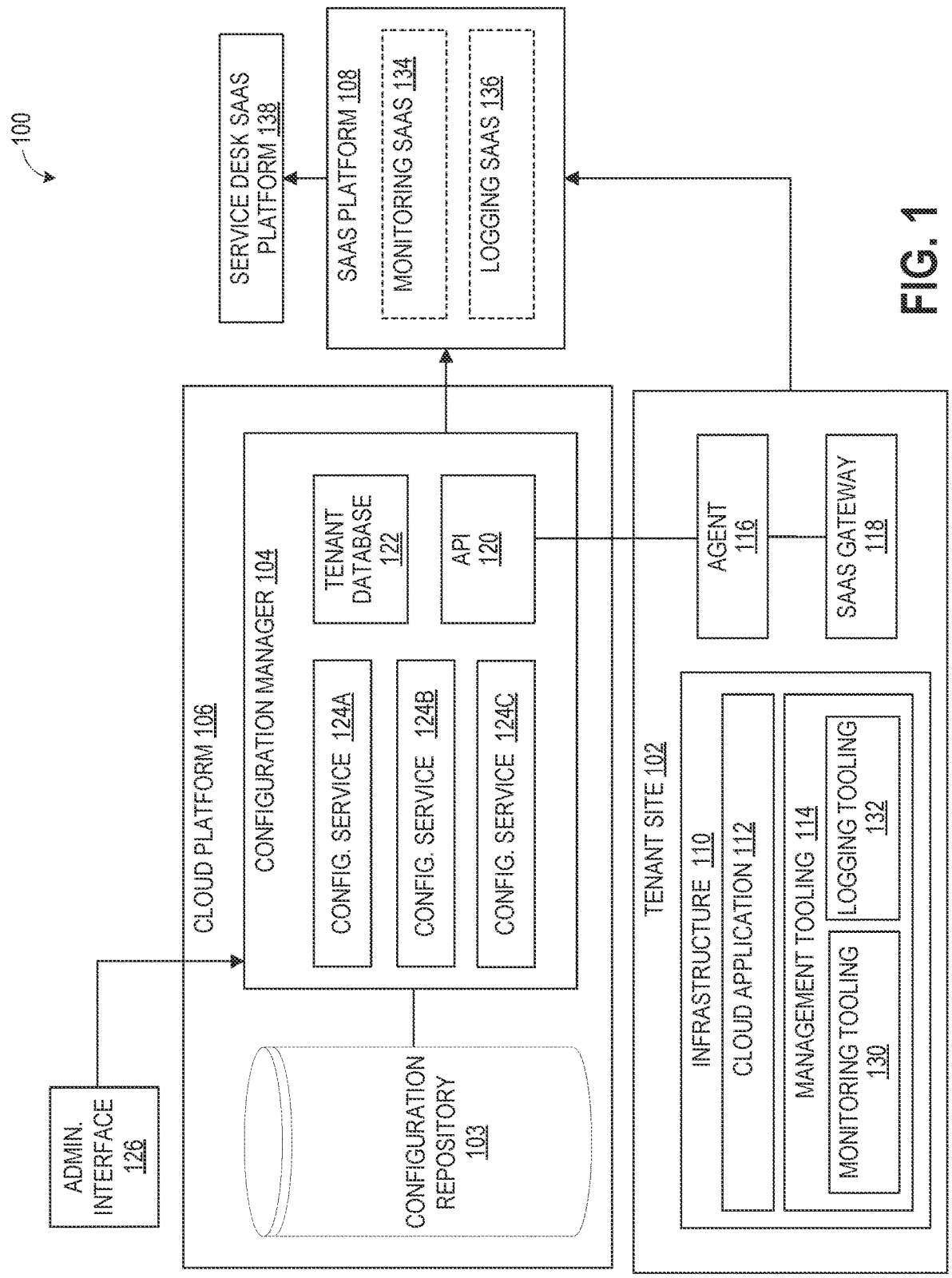
FIG. 1 is a network environment including an example configuration manager deployed on a cloud platform for configuring a SaaS platform.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. As used herein, the term "includes" means includes but is not limited to, the term "including" means including but not limited to. The term "based on" means based at least in part on.

Several Software as a Service (SaaS) platforms allow customers to remotely manage applications hosted on respective on-premise infrastructure associated with the customer. A customer that is a registered user of a SaaS platform is referred to as a tenant of the SaaS platform and is provisioned access to one or more features of the SaaS platform. For managing an application hosted on a tenant site, the SaaS platform may be configured with configuration content associated with the application. The term "tenant site" as used herein may refer to an on-premise infrastructure associated with the customer that is registered with the SaaS platform as a tenant. The configuration content may be associated with a monitoring tooling or a logging tooling used for or on the application. In many cases, the configuration content may be different for each deployment of an application at the tenant site. The SaaS platform receives tooling data from the applications and infrastructure at the tenant site via a gateway. The gateway may be deployed at the tenant site to connect the applications and the on-premise infrastructure to be monitored to the SaaS platform.

Typically, the SaaS platform is configured with configuration content associated with the application (and for each different deployment of the application) using a combination of manual configuration via a user interface and automation using scripting. Also, generally, different SaaS platforms may require configuration content in different formats, and the scripting used may be specific to the SaaS platform. Further, the SaaS platform may be configured many times, e.g. for all the tooling for monitoring multiple applications of multiple tenants across tenant sites. Configuring the SaaS platform for the applications using manual configuration and scripting may be time-consuming and prone to errors due to the manual configuration of each application.

Therefore, in accordance with the aspects of the present disclosure, a configuration manager is presented that may obviate one or more of the challenges mentioned hereinabove. The configuration manager may be hosted on a cloud platform separate from a tenant site of a tenant. In some examples, the configuration manager may receive a request for enabling remote management of a cloud application hosted at the tenant site. On receiving the request from the tenant, the configuration manager may determine the configuration content applicable to the cloud application hosted on the tenant site from a configuration repository. The configuration repository may maintain the configuration content associated with the cloud application. The configuration content defined for the cloud application may a generic configuration content that may apply to similar cloud applications. Hence, one configuration content may be used for supporting multiple similar cloud applications. The re-use of the configuration content for configuring the cloud applications of a new tenant site allows for faster configuration of the SaaS platform.

During operation, on receiving the request, the configuration manager may execute a configuration service to configure a SaaS platform for remotely managing the cloud application. The configuration manager may support multiple independent configuration services, and the configuration service to use may be selected based on management tooling deployed at the tenant site. The management tooling may be a monitoring tooling or a logging tooling.

The multiple independent configuration services may execute asynchronously to configure different SaaS instances using the respective configuration content. For example, a configuration service used for configuring a monitoring SaaS platform may run independently from another configuration service used for configuring a logging SaaS platform. Thus, utilizing separate configuration services to configure respective tooling may reduce overall delays and also may reduce interdependencies and impacts between tooling. Once configured, the SaaS platform may receive monitoring data or logging data from the infrastructure of the tenant site.

Referring now to the figures, FIG. 1 illustrates a network environment 100 including an example configuration manager 104. The network environment 100 may include a tenant site 102 with infrastructure 110, a cloud platform 106, and a Software as a Service (SaaS) platform 108. The cloud platform 106 may include a configuration repository 103 and the configuration manager 104. The configuration manager 104 may be deployed on the cloud platform 106 and may be involved in configuring a SaaS service (provided by the SaaS platform 108) to remotely manage cloud applications (described later) hosted at the tenant site 102 based on configuration content retrieved from the configuration repository 103. Although FIG. 1 depicts the cloud platform 106 hosting the configuration manager 104, it should be understood that the configuration manager 104 may be implemented as a standalone server. The server may include a computer that performs the functions of the configuration manager 104.

The tenant site 102 depicted in FIG. 1 may be a data centre. The tenant site 102 may belong to a tenant user of the SaaS platform 108. The tenant user may be a registered user of the SaaS platform 108. In some examples, the tenant site 102 may include the infrastructure 110, a cloud application 112, a management tooling 114, an agent 116, and a SaaS gateway 118. In some examples, the infrastructure 110 may include several systems including, but not limited to, servers, storage devices, network switches, routers, mobile communication devices, desktop computers, or portable computers. The cloud application 112 may be executing on hardware (e.g., processors) or the infrastructure 110. Examples of the cloud application 112 may include, but are not limited to, a virtual machine (VM), a container, a pod, or a machine-learning (ML) application. It is to be noted that a single cloud application 112 is depicted in FIG. 1 for illustration and explanation, and in other cases, the tenant site 102 may include multiple cloud applications running on the infrastructure 110 which also may be remotely monitored by the SaaS platform 108. Further, it is to be noted that in FIG. 1, a single-tenant site 102 is depicted for illustration purposes, and in some cases, more than one tenant site may be associated with the tenant, without limiting the scope of the present disclosure.

In some examples, the configuration repository 103 may store configuration content associated with infrastructure 110 at the tenant site 102 and/or the cloud application 112. In some examples, the configuration repository 103 may be implemented as a database for storing configuration content. In some examples, the configuration content in the configuration repository 103 may be provided by users managing the cloud application 112 and/or the infrastructure 110. Additional details regarding the configuration repository 103 will be described in conjunction with FIG. 3.

The configuration content stored at the configuration repository 103 may include information, such as, monitoring configuration content and logging configuration content associated with the cloud application 112 and the infrastructure 110 which may be used by the configuration manager 104 to configure the SaaS platform 108. In some examples, the configuration content may indicate metrics to be collected regarding with the functionality of nodes in the infrastructure 110. In some examples, the metrics may be associated with resource utilization, application performance, and operational health. The management tooling 114 may collect data and generate metric data to be sent to the SaaS platform 108. The metric data received at the SaaS platform 108 may be analysed based on the metrics defined by the configuration content.

The cloud application 112 hosted on the infrastructure 110 may be managed and monitored using the management tooling 114 hosted on the infrastructure 110. The management tooling 114 may be provided by a service provider used for monitoring the cloud application 112. The management tooling 114 may include a monitoring tooling 130 and/or a logging tooling 132. In some examples, the management tooling 114 may be specialized software applications or daemons that are installed on the infrastructure 110 at the tenant site 102 and designed to receive monitoring data and/or logging data from various nodes in the infrastructure 110. The monitoring tooling 130 may provide active monitoring of hardware and software components associated with the cloud application 112 and the Infrastructure 110. For example, virtualization infrastructure and the individual VMs hosted on the infrastructure 110 may be monitored by the monitoring tooling 130. Further, in some examples, the logging tooling 132 may perform collection, aggregation, and analytics of logs from the cloud application 112. For example, log files associated with the cloud application 112 may be received and tracked by the logging tooling 132.

In some examples, an agent 116 may be configured by the configuration manager 104 at the tenant site 102. In some examples, the agent 116 may be implemented in hardware or a combination of hardware and programming (e.g., machine-readable instructions executable by a processor(s)) to deploy and configure software components that connect the infrastructure 110 to the SaaS platform 108. In an example, the agent 116 may set up and configure the SaaS gateway 118 at the tenant site 102. In some implementations, the agent 116 and/or the SaaS gateway 118 may be implemented in or executing on servers at the tenant site 102, which may be the same as or separate from the infrastructure 110.

In some examples, the SaaS gateway 118 may be used for routing requests from the tenant site 102 to the configuration manager 104. Further, in some examples, the SaaS gateway 118 may connect the infrastructure 110 to the SaaS platform 108 for discovery, monitoring, and logging of the Infrastructure 110 and the cloud application 112. In an example, the SaaS gateway 118 may be used for creating an Internet Protocol Security (IPSec) tunnel between the tenant site 102 and the SaaS platform 108. Further, in some examples, the SaaS gateway 118 may perform filtering or data transformation functions before routing the logging data or monitoring data to the SaaS platform 108. In some examples, the tooling data may include monitoring data and logging data. The monitoring data may be associated with usage of the infrastructure 110 by the cloud application 112. For example, the SaaS gateway 118 may transmit the monitoring data, such as, but not limited to, processor usage, processor usage per user, storage usage, or other metrics associated with the cloud application 112, to the SaaS platform 108. In some examples, the logging data may be associated with a sequence of events performed by the cloud application 112. In an example, the SaaS gateway 118 may transmit the logging data, such as the log files associated with the cloud application 112 or the infrastructure 110 to the SaaS platform 108.

The configuration manager 104 may include an application programming interface (API) 120, a tenant database 122, a set of one or more configuration services (e.g., 124A, 124B, and 124C), and an administrator interface 126. The administrator interface 126 may allow an administrator of the configuration manager 104 to access and configure various functionalities supported by the configuration manager 104.

The configuration manager 104 may receive requests from the tenant site 102 and may store information corresponding to the requests in the tenant database 122. In some examples, the tenant database 122 may store the information corresponding to the requests from the tenant site 102 along with details of the tenant site 102. In an example, the details of the tenant site 102 may include a name of the tenant associated with the tenant site 102, the cloud application 112 to be monitored and, the management tooling 114 for managing the cloud application 112. Along with maintaining the requests received from the tenant site 102, the tenant database 122 may store tokens or credentials required by the management tooling 114 to connect the infrastructure 110 to the SaaS platform 108. In an example, the administrator of the configuration manager 104 may monitor the tenant database 122 to detect the requests received from the tenant site 102. In some examples, the requests received from the tenant site 102 may be processed by automatically invoking the API 120 in the configuration manager 104.

In some examples, when a new tenant (e.g., the tenant associated with tenant site 102) is on-boarded to the SaaS platform 108, the configuration manager 104 may perform a configuration discovery to determine the cloud application 112 and corresponding infrastructure 110. The configuration manager 104 may transmit probe messages to the agent 116 at the tenant site 102 to determine a configuration for the cloud application 112. In an example, the configuration for the cloud application 112 may define the relationship or connection between the cloud application 112 and associated infrastructure 110. Based on responses from the cloud application 112, the configuration manager 104 may determine the configuration of the cloud application 112 and associated infrastructure 110. Once the configuration discovery is complete, the configuration manager 104 may determine the configuration content corresponding to the cloud application 112 from the configuration repository 103 and configure the SaaS platform 108 for remotely managing the application.

In some implementations, the SaaS platform 108 may be a service provided by a vendor that is different from the vendor providing the infrastructure 110 and the cloud application 112. In an example, the SaaS platform may provide by a third-party service providing the management tooling 114 for the tenant site 102. In another example, the SaaS platform may be provided by the vendor providing the infrastructure 110 at the tenant site 102 and the SaaS platform 108 may be hosted on an external cloud. In some examples, the SaaS platform may be implemented as a hardware-based server executing software that allows remote monitoring of the cloud application 112 based on the configuration content associated with the cloud application 112. In some examples, the SaaS platform 108 may allow the tenant users associated with the tenant site 102 to monitor and track the cloud application 112. Users on a service team (i.e., the team managing the cloud application 112) of the tenant may access the tooling data (e.g., the monitoring data and/or the logging data) associated with the cloud application 112 from a client device using an interface such as a web browser. The SaaS platform 108 may allow the tenant users of the tenant site 102 to access the cloud application 112 and the infrastructure 110. Further, the SaaS platform 108 may be configured to provide aggregated data and insights into the cloud application 112, resource utilization of the infrastructure 110, and operational health at the tenant site 102.

In some examples, the SaaS platform 108 may include one or more SaaS platforms based on the management tooling 114 at the tenant site 102. One or more SaaS platforms may be SaaS cloud-based services provided for the monitoring tooling and logging tooling. In an example, the SaaS platform may be implemented as a monitoring SaaS 134 (also, referred to as a monitoring SaaS platform 134) that operates in conjunction with the monitoring tooling 130. In another example, the SaaS platform 108 may be implemented as a logging SaaS 136 (also, referred to as a logging SaaS platform 136) that operates in conjunction with the logging tooling 132. In some examples, additional details regarding the monitoring SaaS platform 134 and the logging SaaS platform 136 are described in conjunction with FIG. 4.

The configuration manager 104 shown in FIG. 1 may be a cloud-based system providing a service for configuring the SaaS platform 108 according to the configuration content associated with the cloud application 112. In some examples, the service provided by the configuration manager 104 may be subscribed to by an interested tenant, for example, a tenant associated with the tenant site 102. In certain other examples, the configuration manager 104 may be implemented using hardware resources such as a computing system, server, a special purpose device accessible via the cloud network of the cloud platform 106, or the like. In some examples, the configuration manager 104 may be hosted on a hardware-based computer of the cloud platform 106. The cloud platform 106 is external to and separate from the tenant site 102. The cloud platform 106 may provide authorized users (i.e., the tenant users) access to the infrastructure 110 using a cloud network. In some examples, the cloud platform 106 may be a public, private, or hybrid cloud network which may include a network of infrastructure (similar to the infrastructure 110, for example) that are interconnected via the Internet, collocated at a common area, or distributed among several locations.

The API 120 is an interface by which other applications communicate with the configuration manager 104. In some examples, the API 120 may be a Representational State Transfer (REST) or Simple Object Access Protocol (SOAP) based API that is configured by the administrator of the configuration manager 104. Further, the API 120 present in the configuration manager 104 may be invoked to configure the SaaS platform 108 based on the configuration content for the cloud application 112. In some examples, the API 120 may enable communication between the tenant site 102 and the SaaS platform 108. Further, in some examples, the API 120 in the configuration manager 104 may aid in configuring the SaaS platform 108 for discovery, monitoring, and logging of the cloud application 112.

In an example, the request for enabling remote management of the cloud application 112 may include an invocation of the API 120 of the configuration manager 104 by the agent 116 of the tenant site 102. In an example, the request may be received in the form of an API call via the agent 116.

The configuration manager 104 may enable automated configuring of the SaaS platform 108 for the cloud application 112 by retrieving configuration content from the configuration repository 103 and configuring the SaaS platform 108.

The API 120 may be invoked in response to the API call from the tenant site 102 via the agent 116. The API 120 may execute a configuration service such as, one or more of, configuration services 124A and 124B for configuring the SaaS platform 108 for the cloud application 112 based on the configuration content. The configuration services 124A and 124B may be associated with the monitoring tooling 130 or the logging tooling 132 hosted at the tenant site 102. For example, the configuration service 124A may be a service for configuring the monitoring SaaS 134, and the configuration service 124B may be a service for configuring the logging SaaS 136. The configuration service 124C may be used for configuring a service desk aspect of the SaaS platform 108. The service desk SaaS platform 138 is configured for the tenant site 102 as per tenant user requirements. The service desk SaaS 138 provides an interface that displays a status of events occurring at the cloud application 112 and the infrastructure 110.

In addition to configuring the SaaS platform 108, the configuration manager 104 may process other requests from the tenant site 102. In an example, the API 120 in the configuration manager 104 may be invoked to update an existing configuration of the cloud application 112 at the SaaS platform 108. In another example, an administrator may send an update request to invoke the API 120 for processing the request from the tenant site 102 via the administrator interface 126. For example, after the logging tooling 132 is added at the tenant site 102, and configuration content for logging of the cloud application 112 is received at the configuration repository 103, the administrator may transmit an API call request via the administrator interface 126 to request the configuration manager 104 to update the logging SaaS platform 136 for the tenant site 102 according to the configuration content.

The configuration manager 104 may allow automatic configuration of the SaaS platform 108 (i.e., the monitoring SaaS 134, or the logging SaaS 136) using configuration content from the configuration repository 103. This type of automatic configuration may reduce the errors in configuring the SaaS platform 108 in comparison to manual provisioning of the SaaS platform 108. Additionally, configuration manager 104 may update the SaaS platform 108 responsive to a change at the tenant site 102 or a change in the configuration content. The configuration of the SaaS platform 108 may be updated by the configuration manager 104 based on detecting a change in the infrastructure 110 at the tenant site 102 or a change in the configuration content. This type of update of the SaaS platform 108 ensures that the cloud application 112 is managed as per the changes in the infrastructure 110 and the configuration content.

Figure 2:
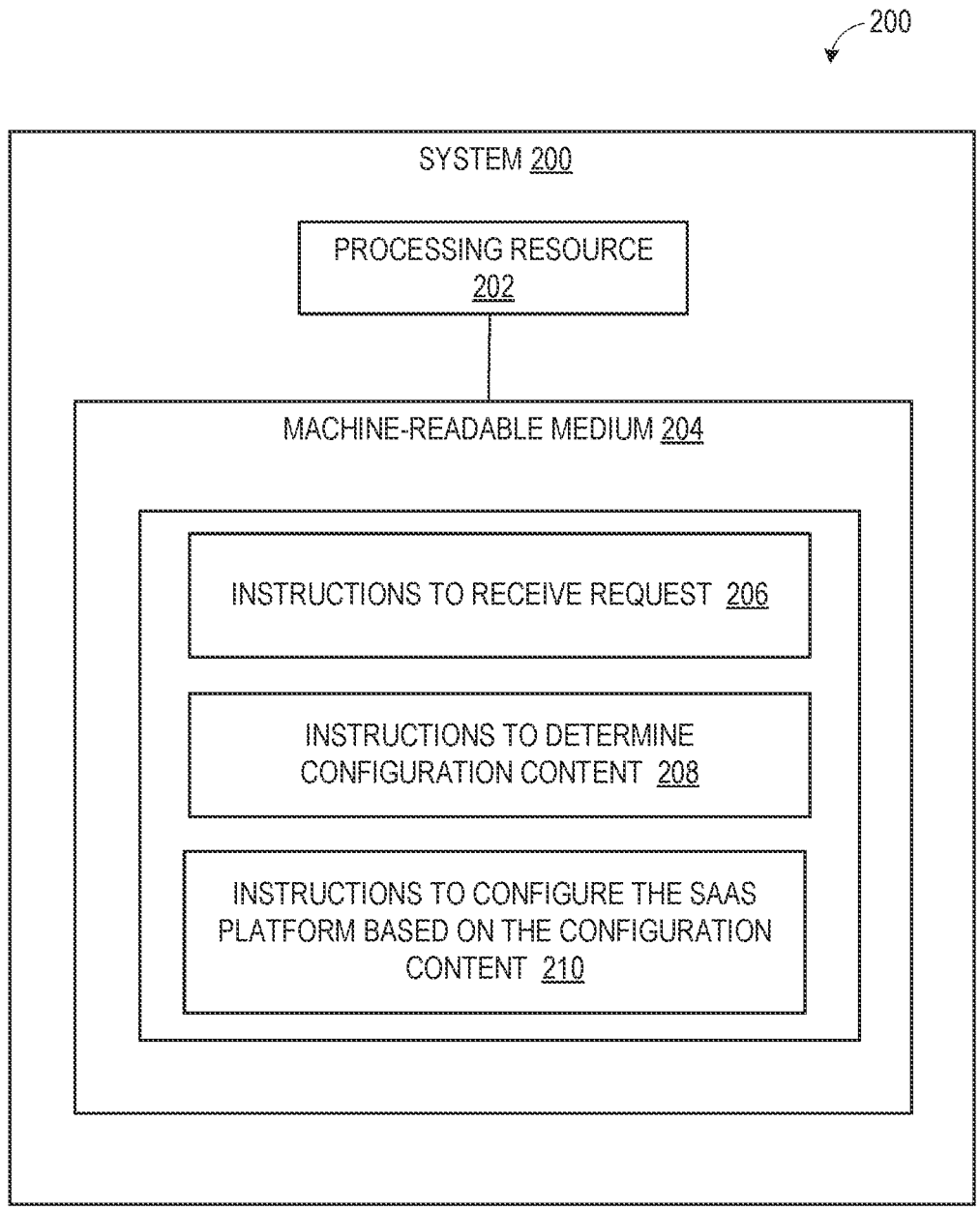
FIG. 2 is a block diagram of an example system for implementing a configuration manager.

Referring now to FIG. 2, an example system 200 for implementing the configuration manager 104 is presented. In some examples, the system 200 may have hardware including a processing resource 202 and a machine-readable medium 204. In some examples, the system 200 may be a physical server. The configuration manager 104 may be implemented by executing instructions of the machine-readable medium 204 on the processing resource 202. When implemented in this manner, the configuration manager 104 may be executing on the system 200 as an application, in a virtual machine, as a container or container pod, etc.

The processing resource 202 may be one or more microprocessors, microcomputers, microcontrollers, digital signal processors, central processing units, state machines, logic circuitries, and/or any devices that manipulate signals based on operational instructions. Further, the machine-readable medium 204 is non-transitory and may be any electronic, magnetic, optical, or other physical storage devices that may store data and/or executable instructions. The machine-readable medium 204 may be encoded with executable instructions 206, 208, and 210 (hereinafter collectively referred to as instructions 206-210) for provisioning the tenant in the SaaS platform 108 and configuring the SaaS platform 108 for managing the cloud application 112 used by the tenant site 102.

The processing resource 202 may be coupled to the machine-readable medium 204. The processing resource 202 may be configured to execute instructions 206-210 (i.e., programming or software code) stored in the machine-readable medium 204 for provisioning the tenant at the SaaS platform 108 and configuring the SaaS platform 108 for monitoring and tracking the cloud application 112. In certain examples, as an alternative or in addition to retrieving and executing the instructions 206-210, the processing resource 202 may include at least one integrated circuit, other control logic, other electronic circuits, or combinations thereof that include a number of electronic components for performing the functionalities intended to be performed by the configuration manager 104.

In an example, the instructions 206, when executed by the processing resource 202, may cause the processing resource 202 to receive a request for enabling remote management for the cloud application 112 hosted at the infrastructure 110 of the tenant site 102. The request may include an invocation of the API 120 at configuration manager 104.

Further, the instructions 208, when executed by the processing resource 202, may cause the processing resource 202 to determine the configuration content corresponding to the cloud application 112. In some examples, the processing resource 202 may retrieve the configuration content corresponding to the cloud application 112 from the configuration repository 103 based on the configuration retrieved from the tenant site 102 during discovery.

Furthermore, the instructions 210, when executed by the processing resource 202, may cause the processing resource 202 to configure the SaaS platform 108 for remotely managing the cloud application 112 based on the configuration content. When the API 120 is invoked at the configuration manager 104, the configuration service 124A and/or the configuration service 124B may be executed for configuring the monitoring SaaS 134 and/or the logging SaaS 136.

Figure 3:
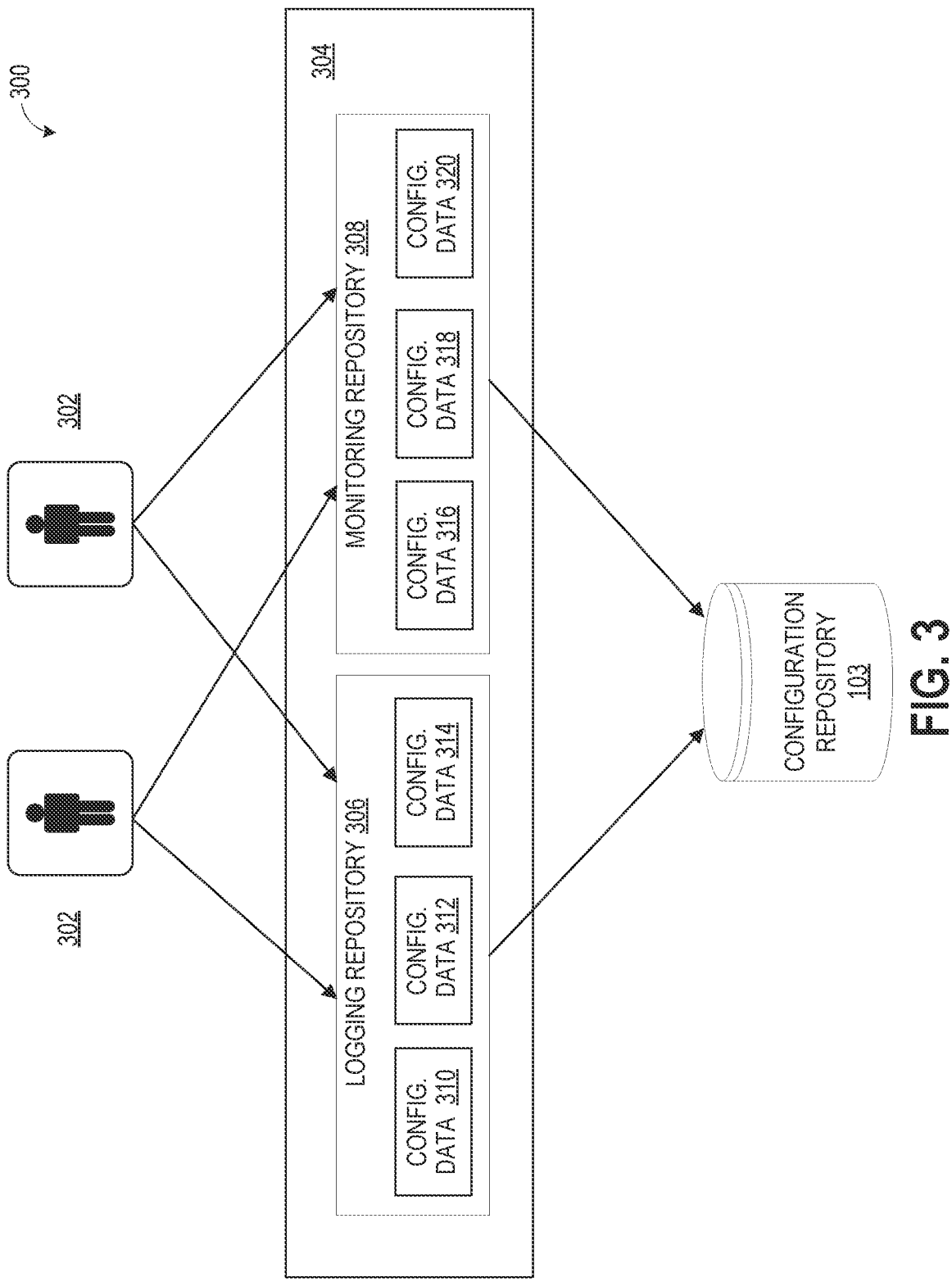
FIG. 3 is a block diagram depicting generation of an example configuration repository.

FIG. 3 is a block diagram 300 depicting the generation of the configuration repository 103, according to an example. In some examples, the members 302 of a service team managing the cloud application 112 may submit configuration content for monitoring of the cloud application 112 hosted on the infrastructure 110 to a service repository 304. In some examples, the configuration content may be entered in a standard format via a GitOps interface. The standard format may be suitable for multiple cloud applications. In some examples, the configuration content may be submitted by the members of a service team via a user interface in an established format that is human-readable and may be parsed by a program. The received configuration content is parsed and translated into a standardized format that can be used for configuring the SaaS platform 108. The use of this type of standardized format for configuration content may reduce any inconsistencies in managing the cloud application 112 at the SaaS platform 108.

At the service repository 304, the configuration content received from the user may be separated based on the management tooling 114 to which the configuration content is applicable. For example, configuration content related to the logging tooling 132 may be stored in a logging repository 306 portion of the service repository 304, and configuration content related to the monitoring tooling 130 may be stored in a monitoring repository 308 portion of the service repository 304. The logging repository 306 may be populated with configuration data 310, 312, and 314 associated with cloud applications running at the infrastructure 110 of the tenant site 102. In an example, the configuration data 310, 312, and 314 may include sets of rules that establish log pattern matches and associated alerts to be triggered. The monitoring repository 308 may be populated with configuration data 316, 318, and 320 associated with cloud applications running at the infrastructure 110 of the tenant site 102. In an example, the configuration data 316, 318, and 320 may indicate sets of metrics to be tracked for different types of nodes or devices in the infrastructure 110 and rules specifying alerts to be triggered based on the pre-defined metric thresholds.

In some examples, the configuration content may include policies for managing the cloud application 112. The policies may be received from users managing the cloud application 112. The policy may be data or metadata used for assisting in remote management of the cloud application 112. The policies may represent several rules or sets of rules that may be applicable for remote management of the cloud application 112. In some examples, the rules or set of rules may be related to logging of user activities, cloud resource metrics to be monitored, log patterns to be identified in network monitoring, or workload execution metrics to be monitored. The configuration content may indicate metrics associated with the functionality of nodes in the infrastructure 110. In some examples, the metrics may be associated with resource utilization, application performance, and operational health.

The configuration content in the logging repository 306 and the monitoring repository 308 may be put through automated tests of syntax and additional tests that validate the configuration content. The configuration content validated by the tests can be used for configuring the SaaS platform 108 for the cloud application 112. In some examples, the configuration content may be published into the configuration repository 103 when the configuration content in the logging repository 306 and the monitoring repository 308 successfully pass several continuous integration tests.

Additionally, the configuration content may be maintained in a standard format for each cloud application 112 (and each different deployment of the cloud application) at the configuration repository 103. The configuration manager 104 may determine the configuration content applicable for the cloud application 112 and configure the SaaS platform 108. In some examples, the use of the configuration content provided in the standard format allows the configuration manager 104 to configure the SaaS platform 108 in a short time. Additionally, the configured SaaS platform 108 may display reduced inconsistencies and errors while managing the cloud application 112 due to the use of standardized formats.

Further, in many cases, a generic configuration content may be defined for the cloud application (and each different deployments of the cloud application). The users of the service team managing multiple tenants may define a single generic content for the cloud application 102, which may apply to deployments across multiple tenant sites and multiple tenants. The availability of generic configuration content allows for faster provisioning of the SaaS platform for new tenants for which configuration content is not available.

Figure 4:
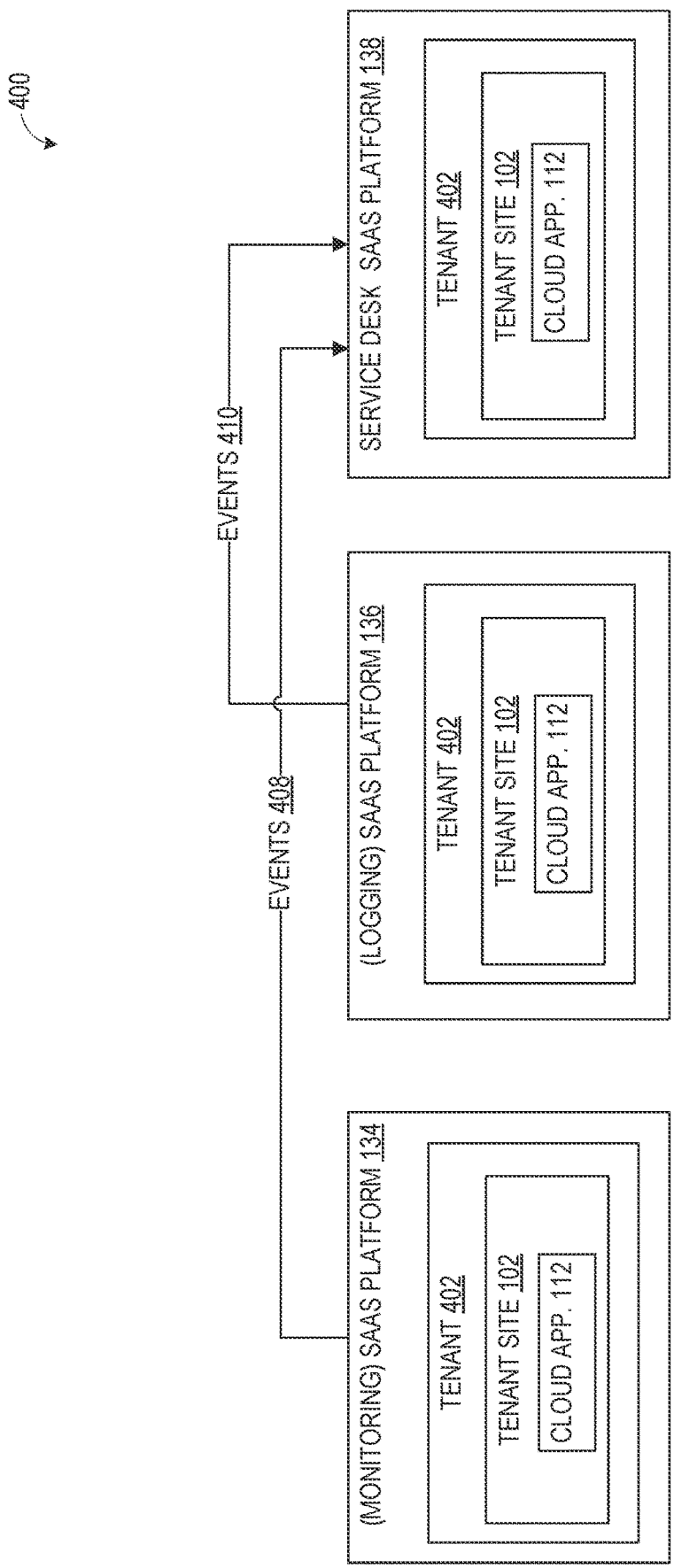
FIG. 4 depicts example SaaS platforms used for managing the cloud application.

Referring now to FIG. 4, a block diagram 400 depicting example SaaS platforms used for managing the cloud application 112 hosted at the infrastructure 110 is presented. As discussed in FIG. 1, the management tooling 114 may be the monitoring tooling 130 or the logging tooling 132. The configuration manager 104 provisions a tenant 402 at the SaaS platforms for the tenant site 102. The name of tenant 402 may be derived from the name of the tenant. The provisioned tenant 402 may be, for example, an account, a profile, a workspace, or the like at the management tooling 114.

For example, the configuration manager 104 may provision the tenant 402 in the monitoring SaaS platform 134 for the monitoring tooling 130. In some examples, the configuration manager 104 may provision the tenant 402 in the logging SaaS platform 136 for the logging tooling 132. The provisioning of tenant 402 may be done for new tenants of the cloud platform 106.

When the configuration manager 104 receives a request to enable remote monitoring of the cloud application 112, the configuration manager 104 retrieves the configuration content associated with the cloud application 112 that is stored at the configuration repository 103 (as discussed in relation to FIG. 3). The request may be received from the tenant site 102 in the form of an API 120 call via the agent 116. The API call is processed by the configuration manager 104 by executing the configuration services 124A-124C. For example, the configuration services 124A and 124B may be executed independently for configuring the monitoring SaaS platform 134, and the logging SaaS platform 136 respectively. As different configuration services are used for configuring the monitoring SaaS platform 134 and the logging SaaS platform 136 asynchronously, the on-boarding of a new tenant may be completed with reduced delay. Additionally, when the new tenant (e.g., the tenant 402) is provisioned at the monitoring SaaS platform 134 and the logging SaaS platform 136, configuration data (credentials or access token) specific to the tenant site 102 may be generated. The configuration data corresponding to the monitoring SaaS platform 134 and the logging SaaS platform 136 may be used for connecting the infrastructure 110 to the monitoring SaaS platform 134 and the logging SaaS platform 136 respectively. This configuration data may be stored at the tenant database 122.

The monitoring SaaS platform 134 and the logging SaaS platform 136 may be configured according to the retrieved configuration content associated with the cloud application 112 and/or the infrastructure 110. In some examples, the monitoring SaaS platform 134 and the logging SaaS platform 136 may be configured with configuration content for monitoring the cloud applications 112 deployed at the tenant site 102.

In addition to configuring the monitoring SaaS platform 134 and/or the logging SaaS platform 136, the configuration manager 104 may execute the configuration service 124C to provision the tenant at the service desk SaaS platform 138. The service desk SaaS platform 138 may be configured based on the cloud application 112 at tenant site 102. The service desk SaaS platform 406 may be accessible to the users managing the cloud application 112 via an interface (e.g., a web browser).

The SaaS platforms (i.e., the monitoring SaaS platform 134, or logging SaaS platform 136) may receive the tooling data (i.e., monitoring data or logging data) from the infrastructure 110 at the tenant site 102 via the SaaS gateway 118. Based on the received monitoring data or logging data, the monitoring SaaS platform 134 or logging SaaS platform 136 may generate alerts as per the configuration content used for configuring the monitoring SaaS platform 134 and the logging SaaS platform 136.

Any events occurring at the cloud application 112 or on the associated resources (i.e., the infrastructure 110) may be detected by the monitoring SaaS platform 134 or the logging SaaS platform 136. In the example presented in FIG. 4, the monitoring SaaS platform 134, or logging SaaS platform 404 may route events (shown as 408 and 410) occurring at the cloud application 112 (and the associated infrastructure 110) to the service desk SaaS platform 406. The events may be alerts or incidents that are occurring at the tenant site 102. The service desk SaaS platform 406 may provide an interface to an administrator of the tenant site 102 to monitor and track the status of the events (e.g. alerts or incidents) associated with the cloud application 112. The service desk SaaS platform 406 may display the status of events via the interface.

In some implementations, a tenant may be associated with multiple tenant sites (which may include tenant site 102). Each of the tenant sites may be provisioned under the same tenant 402 at each of the SaaS platforms 134, 136, 138. A tenant may also have multiple cloud applications (which may include the cloud application 112) hosted at a tenant site 102, and the same tenant 402 may be provisioned at multiple SaaS platforms 134, 136, and 138.

Figure 5:
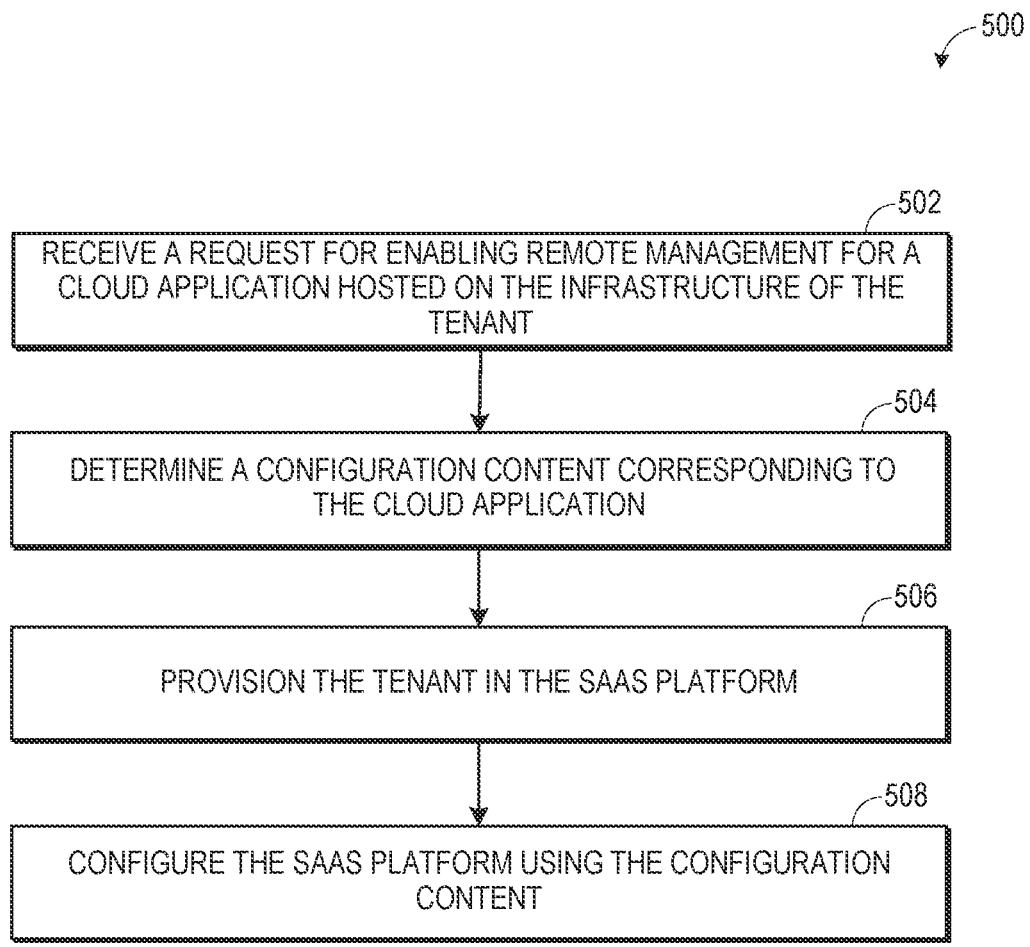
FIG. 5 is a flow diagram of an example method for enabling remote management of a cloud application in a SaaS platform.

Referring now to FIG. 5, a flow diagram of an example method 500 for enabling remote management of the cloud application 112 in the SaaS platform 108 is presented, in accordance with an example. Before provisioning the tenant in the SaaS platform 108 and configuring the SaaS platform 108, certain pre-provisioning activities may be performed. For example, configuration content related to the cloud application 112 that is to be managed may be received by the configuration manager 104 using the API 120. Further, the configuration content applicable to the cloud application 112 may be updated in the configuration repository 103 based on the configuration content received from members of a service team managing the cloud application 112. The members of the service team may be responsible for managing the cloud applications of multiple tenants across multiple tenant sites. The method 500 depicted in FIG. 5 may be implemented in the form of executable instructions stored on a machine-readable medium and executed by a processing resource. For example, method 500 may be performed by the configuration manager 104 or by the system 200 which may implement an example of the configuration manager 104. FIG. 5 will be explained in conjunction with FIG. 1.

At block 502, the configuration manager 104 may receive a request for enabling remote management for the cloud application 112 hosted on the infrastructure 110 of the tenant site 102. The request may be from the tenant site 102 and may be received at the configuration manager 104 and stored in the tenant database 122. In some examples, the request may be for remote management of several cloud applications deployed on the infrastructure 110 at the tenant site 102. Further, in some examples, the request may be related for an action other than enabling remote management, such as a request to update the SaaS platform 108 in response to change in the monitoring tooling 130 or the logging tooling 132.

At block 504, the configuration manager 104 may determine and retrieve a configuration content corresponding to the cloud application 112 from the configuration repository 103. In some examples, the configuration content may be related to the infrastructure 110. In some examples, for the cloud application 112, a logging configuration content provided by the users managing the cloud application 112 may be retrieved from the configuration repository 103. In an example, a logging configuration content may instruct that the logs from the cloud application 112 are to be monitored, and the logging configuration content may also define a log query for identifying variations in a measured utilization metric from the cloud application 112. Further, in some examples, for the cloud application 112, monitoring configuration content provided by the users managing the cloud application 112 may be retrieved from the configuration repository 103. For example, a monitoring configuration content may define a metric to be tracked at a node in the infrastructure 110 that is used by the cloud application 112.

At block 506, the configuration manager 104 may provision the tenant in the SaaS platform 108. The provisioning may be performed for a new tenant or a new tenant site 102 that is being managed by the cloud platform 106. The tenant may be provisioned at the SaaS platform 108 using the name of the tenant. In an example, the SaaS platform 108 may be the monitoring SaaS platform 134 when the monitoring tooling 130 is used by the cloud application 112. The configuration manager 104 may provision the tenant at monitoring SaaS platform 134. Similarly, in another example, the SaaS platform 108 may be a logging SaaS platform 136 when the logging tooling 132 is used by the cloud application 112. The configuration manager 104 may provision the tenant at the logging SaaS platform 136. In some cases, the tenant may be provisioned at both the monitoring SaaS platform 134 and the logging SaaS platform 136. In addition to the monitoring SaaS platform 134 and the logging SaaS platform 136, the configuration manager 104 may provision the tenant at the service desk SaaS platform 138.

The configuration services 124A and 124B may be executed for provisioning a tenant associated with the tenant site 102 (in case of the tenant is new to the cloud platform 106) at the SaaS platform 108 and for configuring the monitoring SaaS 134 and the logging SaaS 136 for remotely managing the cloud application 112. In an example, the request for remote management of the cloud application 112 is received in the form of an API call. The API 120 may be invoked automatically on receiving an API call via the agent 116 of the tenant site 102. When the API 120 is invoked, the configuration manager 104 may execute the configuration service to configure the SaaS platform 108 and the service desk SaaS platform for remotely managing the cloud application 112. In an example, the configuration service 124B may be executed by the configuration manager for configuring the logging SaaS 136. In some examples, an administrator of the configuration manager 104 may manage the requests from tenants and transmit a request to invoke the API 120 at the configuration manager 104 via the administrator interface 126.

At block 508, the configuration manager 104 may configure the SaaS platform 108 for remotely managing the cloud application 112 using the configuration content retrieved from the configuration repository 103. In some examples, the configuration services 124A and 124B may configure the SaaS platform 108 according to the configuration content used by the cloud application 112. For example, in the case where the monitoring tooling 130 is associated with the cloud application 112, the monitoring SaaS platform 134 may be configured using the configuration service 124A according to a monitoring configuration content corresponding to the cloud application 112. Similarly, if the logging tooling 132 is associated with the cloud application 112, the logging SaaS platform 134 may be configured using the configuration service 124B according to a logging configuration content corresponding to the cloud application 112. In addition to configuring the monitoring SaaS platform 134 and the logging SaaS platform 136, the configuration manager 104 may provision the tenant in the service desk SaaS platform 138 using the configuration service 124C.

Once the tenant is provisioned at the SaaS platform 108 and is configured with relevant configuration content associated with the cloud application 112, the SaaS platform 108 may remotely monitor the cloud application 112 and associated infrastructure 110 according to the configuration content. The SaaS platform 108 may receive the monitoring data and the logging data from the infrastructure 110 of the tenant site 102. The users managing the cloud application 112 or an administrator of the tenant site 102 can remotely manage the cloud application 112 and the infrastructure 110 of the tenant site 102 by receiving alerts that are defined by the configuration content (i.e., rules and thresholds) provided by the users managing the cloud application 112. The SaaS platform 108 is then configured to route alerts and incidents to the service desk SaaS platform 138. For example, the monitoring SaaS platform 134 and the logging SaaS platform 136 may be configured to route the events (i.e., alerts or incidents) to the service desk SaaS platform 138 for the users managing the cloud application 112 of the tenant site 102. The users may view the status of the events using the service desk SaaS platform 138.

Figure 6:
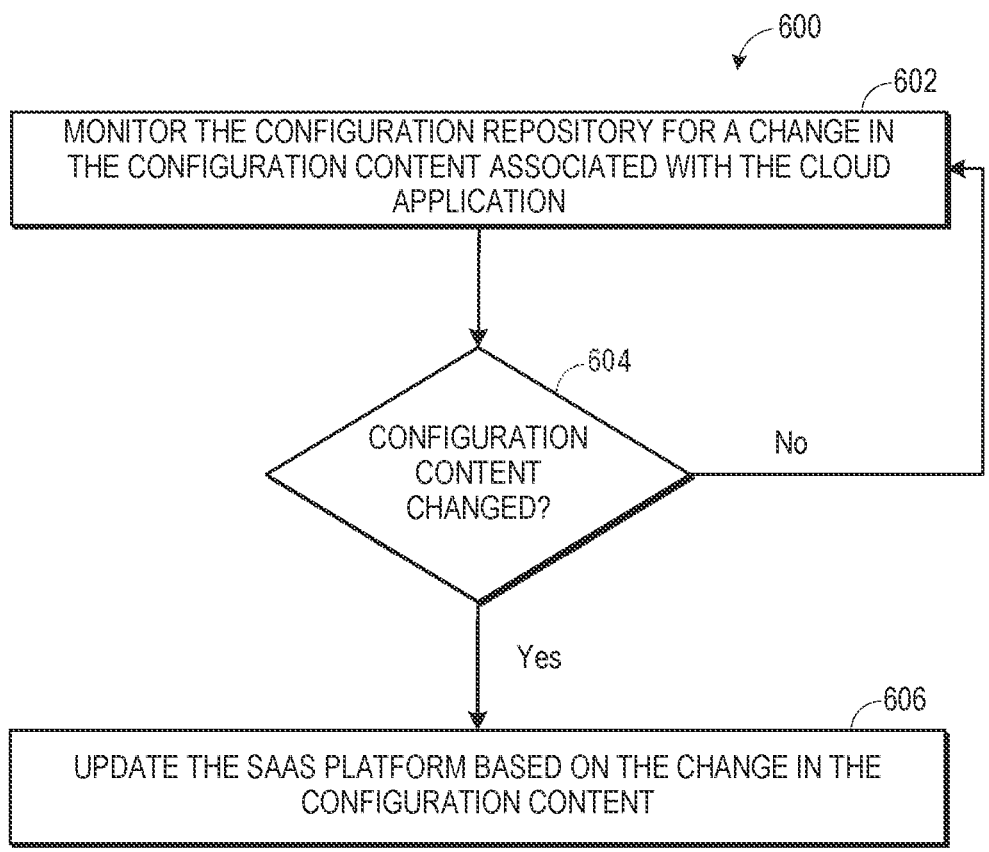
FIG. 6 is a flow diagram of an example method for updating a SaaS platform based on changes in configuration content.
Figure 7:
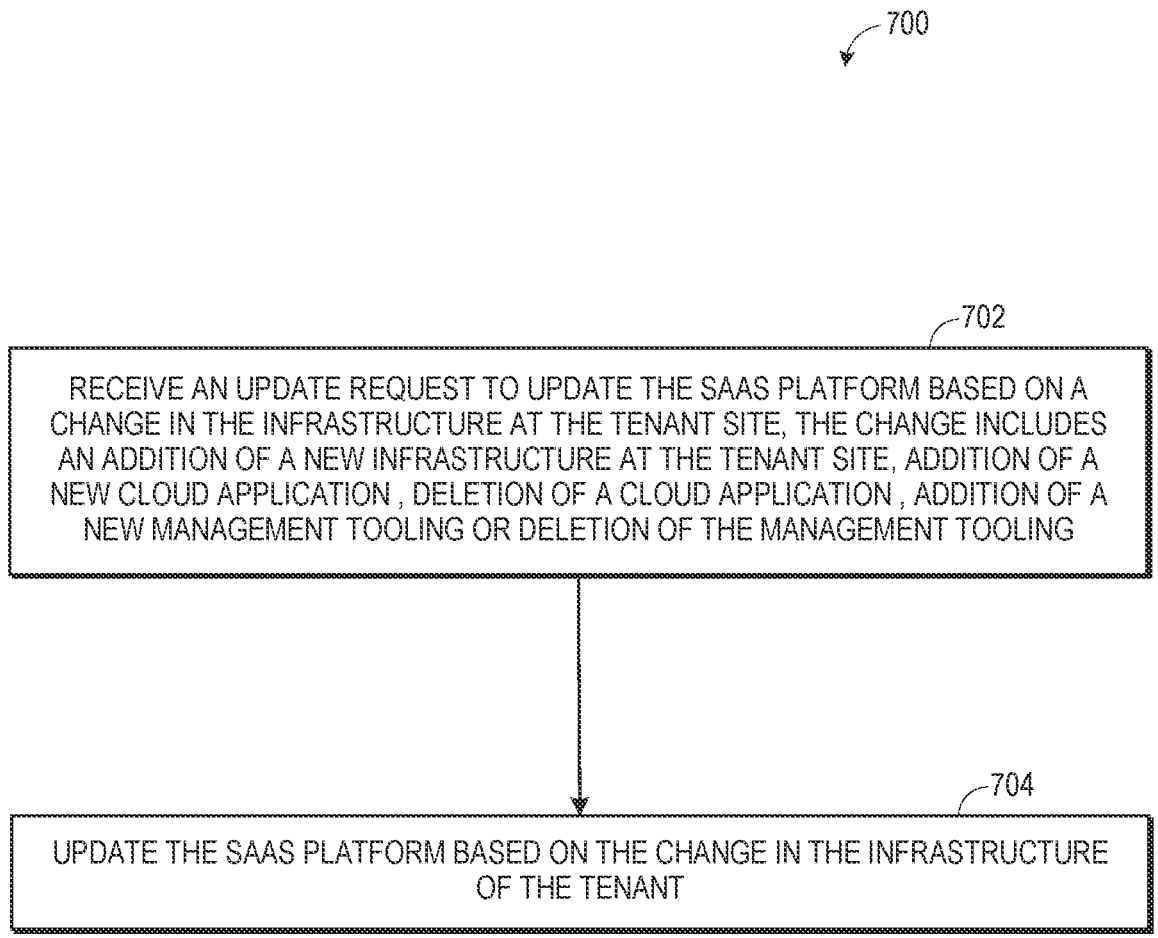
FIG. 7 is a flow diagram of an example method for updating a SaaS platform based on changes in infrastructure at a tenant site.

If there are changes in the configuration content associated with the cloud application 112 or any changes at the infrastructure 110, the SaaS platform 108 may be updated. FIGS. 6 and 7 illustrate example methods of updating the SaaS platform 108. FIG. 6 illustrates a flow diagram of an example method 600 for updating the SaaS platform 108 based on changes in configuration content, and FIG. 7 illustrates a flow diagram of an example method 700 for updating the SaaS platform 108 based on changes in the infrastructure 110. The methods 600 and 700 depicted in FIGS. 6 and 7 may be implemented in the form of executable instructions stored on a machine-readable medium and executed by a processing resource and/or in the form of electronic circuitry. For example, methods 600 and 700 may be performed by the configuration manager 104 or the system 200. The FIGS. 6 and 7 will be explained in conjunction with FIG. 1.

At any point in time, the configuration content associated with the cloud application 112 may be updated, for example, by members of the service team managing the cloud application 112. At block 602, the configuration manager 104 may monitor the configuration repository 103 to detect a change in the configuration content. In some examples, the monitoring of the configuration repository 103 may be performed at periodic intervals. In some examples, the configuration manager 104 may receive a notification from the configuration repository 103 for a change in the configuration content associated with the cloud application 112.

If it is determined that there is no change in the configuration content ("No" at block 604), the configuration manager 104 may continue to monitor the configuration repository 103. If it is determined that there is a change in the configuration content associated with a cloud application 112 ("Yes" at block 604), the method 600 proceeds to block 606 where the configuration manager 104 may update the SaaS platform 108 according to the change in the configuration content. In an example, the SaaS platform 108 may be reconfigured with a new configuration content. In an example, an additional log alert related to cloud application 112 may be added by the user of the service team. The configuration manager 104 may detect the additional log alert in the changed configuration content and update the SaaS platform 108 accordingly. This additional log alert may trigger additional configuration of the SaaS platform 108.

Referring now to FIG. 7, at block 702 the configuration manager 104 may receive a request to update the SaaS platform 108 based on a change in the infrastructure 110 at the tenant site 102. Examples of the change may include, but is not limited to, addition of a new infrastructure (added to infrastructure 110), addition of a new cloud application 112, deletion of a cloud application 112, updates to the management tooling, addition of a new management tooling, or deletion of the management tooling. In some examples, the update of the SaaS platform 108 may be performed on receiving an update request from the tenant via the agent 116. The request may include an API call that invokes the API 120 at the configuration manager 104 to update the SaaS platform 108.

At block 704, based on the received request and the change in the infrastructure 110, the configuration manager 104 may update the SaaS platform 108 via the configuration services 124A, 124B, or 124C. For example, if the management tooling 114 (e.g., a monitoring tooling 130) is removed or deleted at the tenant site 102, the tenant provisioned at the SaaS platform 108 is deleted. In another example, the SaaS platform 108 may be updated (i.e., configured by the configuration manager 104) to support additional cloud applications. For example, when a new cloud application is added at the tenant site 102, the SaaS platform 108 may be updated according to the configuration content.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

We claim:

1. A method comprising:
receiving, by a configuration manager deployed on a cloud platform, one or more requests for enabling remote management for cloud applications hosted on infrastructure at multiple tenant sites that are separate from the cloud platform;
determining, by the configuration manager, from a configuration repository hosted on the cloud platform, a configuration content corresponding to the one or more requests for each of the multiple tenant sites,
wherein the configuration repository provides different generic configuration contents each applicable to similar cloud applications, such that the determined configuration content includes a single generic configuration content for any similar cloud applications hosted at two or more of the multiple tenant sites while including different configuration contents for any cloud applications that are not similar to the similar cloud applications hosted at the two or more of the multiple tenant sites, wherein the generic configuration contents include logging configuration contents and monitoring configuration contents, wherein each logging configuration content defines instructions for monitoring specified logs from a corresponding cloud application, and wherein each monitoring configuration content defines one or more metrics to be tracked at a node in an infrastructure used from a respective cloud application; and configuring, by the configuration manager, a Software as a Service (SaaS) platform for remotely managing the cloud applications hosted on each of the multiple tenant sites based on the determined configuration content, wherein a management tooling deployed at a corresponding tenant site comprises at least one of a monitoring tooling or a logging tooling, and wherein the SaaS platform is associated with the management tooling and receives monitoring data or logging data from the infrastructure at the corresponding tenant site via the monitoring tooling or the logging tooling respectively.

2. The method of claim 1, further comprising configuring, by the configuration manager, the SaaS platform to route events occurring at the cloud applications to a service desk SaaS platform, wherein the service desk SaaS platform provides an interface that displays a status of the events to users managing the cloud applications.

3. The method of claim 2, wherein the configuration content comprises policies for remotely managing the cloud applications.

4. The method of claim 1, wherein one or more of the monitoring data or the logging data are routed to the SaaS platform by a SaaS gateway, wherein the SaaS gateway connects the infrastructure at the corresponding tenant site to the SaaS platform.

5. The method of claim 1, further comprising storing into a tenant database, by the configuration manager, data associated with the corresponding tenant site including information related to a name of the tenant, the cloud applications, and the management tooling.

6. The method of claim 1, further comprising:
monitoring, by the configuration manager, the configuration repository for a change in the configuration content associated with the cloud applications;
determining, by the configuration manager, that there is the change in the configuration content; and
updating, by the configuration manager, the SaaS platform based on the change in the configuration content.

7. The method of claim 5, further comprising:
receiving, by the configuration manager, an update request to update the SaaS platform based on a change in the infrastructure at the corresponding tenant site, wherein the change includes an addition of new infrastructure at the corresponding tenant site, an addition of a new cloud application, a deletion of one or more of the cloud applications, addition of a new management tooling, or deletion of the management tooling; and updating, by the configuration manager, the SaaS platform based on the change in the infrastructure at the corresponding tenant site.

8. The method of claim 7, wherein if the change includes the deletion of the management tooling, the updating of the SaaS platform includes deleting the corresponding tenant site at the SaaS platform.

9. The method of claim 4, wherein each of the one or more requests includes an invocation of an application programming interface (API) of the configuration manager by an agent at the corresponding tenant site.

10. The method of claim 1, wherein the multiple tenant sites are associated with one tenant.

11. The method of claim 1, wherein the multiple tenant sites are associated with multiple tenants.

12. A system comprising:
a processing resource; and
a non-transitory machine-readable medium coupled to the processing resource, the non-transitory machine-readable medium storing instructions that when executed by the processing resource cause the processing resource to:
receive, by a configuration manager deployed on a cloud platform, one or more requests for enabling remote management for cloud applications hosted on infrastructure at multiple tenant sites that are separate from a cloud platform;
determine, by the configuration manager, from a configuration repository, a configuration content corresponding to the one or more requests for each of the multiple tenant sites,
wherein the configuration repository provides different generic configuration contents each applicable to similar cloud applications, such that the determined configuration content includes a single generic configuration content for any similar cloud applications hosted at two or more of the multiple tenant sites while including different configuration contents for any cloud applications that are not similar to the similar cloud applications hosted at the two or more of the multiple tenant sites,
wherein the generic configuration contents include logging configuration contents and monitoring configuration contents,
wherein each logging configuration content defines instructions for monitoring specified logs from a corresponding cloud application, and
wherein each monitoring configuration content defines one or more metrics to be tracked at a node in an infrastructure used from a respective cloud application; and
configure, by the configuration manager, a Software as a Service (SaaS) platform for remotely managing the cloud applications hosted on each of the multiple tenant sites based on the determined configuration content, wherein a management tooling deployed at a corresponding tenant site comprises at least one of a monitoring tooling or a logging tooling, and wherein the SaaS platform is associated with the management tooling and receives monitoring data or logging data from the infrastructure at the corresponding tenant site via the monitoring tooling or the logging tooling.

13. The system of claim 12, wherein the instructions further cause the processing resource to route events detected by the SaaS platform to a service desk SaaS platform, wherein the service desk SaaS platform provides an interface that displays a status of the events to users managing the cloud applications.

14. The system of claim 13, wherein the configuration content comprises policies for remotely managing the cloud applications.

15. The system of claim 12, wherein an agent at the corresponding tenant site is to set up a SaaS gateway for connecting the infrastructure at the corresponding tenant site to the SaaS platform, wherein one or more of the monitoring data or the logging data are routed to the SaaS platform by the SaaS gateway.

16. The system of claim 12, wherein the instructions further cause the processing resource to:
    monitor the configuration repository for a change in the configuration content;
    determine that the change in the configuration content is associated with the cloud applications; and
    update the SaaS platform based on the change in the configuration content.

17. The system of claim 12, wherein the instructions further cause the processing resource to:
    receive an update request to update the SaaS platform based on a change in the infrastructure at the corresponding tenant site, wherein the change comprises of an addition of new infrastructure at the corresponding tenant site, addition of a new cloud application, deletion of one or more of the cloud applications, addition of a new management tooling, or a deletion of the management tooling; and
    update the SaaS platform based on the change in the infrastructure at the corresponding tenant site.

18. The system of claim 16, wherein if the change includes deletion of the management tooling, updating of the SaaS platform includes deleting the corresponding tenant site at the SaaS platform.

19. The system of claim 12, wherein an API is invoked to provision a tenant associated with the corresponding tenant site and configure the SaaS platform.

20. A non-transitory machine-readable medium storing instructions executable by a processing resource, the instructions comprising:
    instructions to receive at a configuration manager deployed on a cloud platform, one or more requests for enabling remote management for cloud applications hosted on infrastructure at multiple tenant sites that are separate from the cloud platform;
    instructions to determine, by the configuration manager, from a configuration repository hosted on the cloud platform, a configuration content corresponding to the one or more requests for each of the multiple tenant sites,
        wherein the configuration repository provides different generic configuration contents each applicable to similar cloud applications, such that the determined configuration content includes a single generic configuration content for any similar cloud applications hosted at two or more of the multiple tenant sites while including different configuration contents for any cloud applications that are not similar to the similar cloud applications hosted at the two or more of the multiple tenant sites,
        wherein the generic configuration contents include logging configuration contents and monitoring configuration contents,
        wherein each logging configuration content defines instructions for monitoring specified logs from a corresponding cloud application, and
        wherein each monitoring configuration content defines one or more metrics to be tracked at a node in an infrastructure used from a respective cloud application; and
    instructions to configure, by the configuration manager, a Software as a Service (SaaS) platform for remotely managing the cloud applications hosted on each of the multiple tenant sites based on the determined configuration content, wherein a management tooling deployed at a corresponding tenant site comprises a monitoring tooling or a logging tooling, and wherein the SaaS platform is associated with the management tooling and receives monitoring data or logging data from the corresponding tenant site via the monitoring tooling or he logging tooling respectively.

21. The non-transitory machine-readable medium of claim 20, wherein the configuration content comprises policies for remotely managing the cloud applications.

22. The non-transitory machine-readable medium of claim 21, wherein the instructions further comprise instructions to configure, the SaaS platform to route events occurring at the cloud applications to a service desk SaaS platform, wherein the service desk SaaS platform provides an interface that displays a status of the events to users managing the cloud applications.

* * * * *